(12) United States Patent
Stuhaug et al.

(10) Patent No.: US 11,975,744 B2
(45) Date of Patent: May 7, 2024

(54) METHOD AND SYSTEM FOR CONTROLLING THE OPERATION OF CONTAINER HANDLING VEHICLES AND DRONES SERVING AN AUTOMATED STORAGE AND RETRIEVAL SYSTEM

(71) Applicant: Autostore Technology AS, Nedre Vats (NO)

(72) Inventors: Ragnar Stuhaug, Skjold (NO); Karl Hatteland, Oslo (NO); Ingvar Fagerland, Kolnes (NO); Øystein Gjerdevik, Skjold (NO); Trond Austrheim, Etne (NO); Synnøve Matre, Sandeid (NO)

(73) Assignee: Autostore Technology AS, Nedre Vats (NO)

( * ) Notice: Subject to any disclaimer, the term of this patent is extended or adjusted under 35 U.S.C. 154(b) by 721 days.

(21) Appl. No.: 17/251,760

(22) PCT Filed: Jun. 11, 2019

(86) PCT No.: PCT/EP2019/065224
§ 371 (c)(1),
(2) Date: Dec. 11, 2020

(87) PCT Pub. No.: WO2019/238687
PCT Pub. Date: Dec. 19, 2019

(65) Prior Publication Data
US 2021/0130090 A1    May 6, 2021

(30) Foreign Application Priority Data

Jun. 12, 2018 (NO) .................................... 20180813
Jul. 19, 2018 (NO) .................................... 20181005
(Continued)

(51) Int. Cl.
*B65G 1/137* (2006.01)
*B61B 13/00* (2006.01)
(Continued)

(52) U.S. Cl.
CPC ............ *B61B 13/00* (2013.01); *B65G 1/0414* (2013.01); *B65G 1/0457* (2013.01);
(Continued)

(58) Field of Classification Search
CPC .. B65G 1/0492; B65G 1/0457; B65G 1/1378; B65G 2201/0235; G05D 2201/0216
See application file for complete search history.

(56) References Cited

U.S. PATENT DOCUMENTS 3,519,150 A    7/1970  Keena et al.
3,800,963 A    4/1974  Holland
(Continued)

FOREIGN PATENT DOCUMENTS

CA    2276512 A1    12/2000
CA    2988122 A1    12/2016
(Continued)

OTHER PUBLICATIONS

Office Action issued in Chinese Application No. 201980037162.3; dated Sep. 27, 2021 (8 pages).
(Continued)

*Primary Examiner* — Kyle O Logan
(74) *Attorney, Agent, or Firm* — Osha Bergman Watanabe & Burton LLP

(57) ABSTRACT

The operation of container handling vehicles and remotely operated specialized container handling vehicles are controlled by a method such that total elapsed time or waiting time cost for transferring specified storage containers between them is minimal or optimal. The specialized container handling vehicles are operating at a level below an automated storage and retrieval system having a framework structure defining a storage grid for storing storage containers in grid cells. The storage containers are stored and retrieved by container handling vehicles running on top of the storage grid. At least one operational controller, which is in communication with a first type of controller in each container handling vehicle and a second type of controller in each specialized container handling vehicle, performs the followings steps: when a specified storage container is to be transferred from a storage column and its corresponding grid cell to a specialized container handling vehicle: assigning and instructing a container handling vehicle to pick up the storage container from the grid cell and lower it to a selected port, located at the lower end of an identified free delivery column by transmitting instructions to the first type of
(Continued)

controller of the assigned container handling vehicle, where the port selected is included as a variable in a weighting function together with time and waiting cost to derive a trade-off of the container handling vehicle and the specialized container handling vehicle having the best matching travel time to the port; moving the container handling vehicle to the grid cell, picking up the storage container and transporting it to a grid cell of the delivery column where the port is; transmitting a signal to the specialized container handling vehicles comprising information of the selected port at a first location and when the storage container will be available at the port; based on responses from the specialized container handling vehicles, assigning and instructing a specialized container handling vehicle to retrieve the specified storage container at the selected port; moving the assigned specialized container handling vehicle to the selected port at the first location, picking up the storage container and bringing it to a second location; and/or, when a specified storage container is to be transferred to a grid cell, for storage in its corresponding storage column, by a specialized container handling vehicle: determining which port at a first location that is to be used, where the port selected is included as a variable in a weighting function together with time and waiting cost to derive a trade-off of the container handling vehicle and the specialized container handling vehicle having the best matching travel time to the port; transmitting instructions to the second type of controller of the specialized container handling vehicle, to transport the storage container from its current location representing the second location, to said determined port at the first location; moving the specialized container handling vehicle from the second location to the determined port at the first location; transmitting a signal to the container handling vehicles comprising information of the determined port to retrieve the storage container from; based on responses from the container handling vehicles, assigning and instructing a container handling vehicle to lift and retrieve the specified storage container from the determined port to be used at the first location; lifting the storage container from the determined port through the delivery column and moving the container handling vehicle for transporting the storage container to a grid cell corresponding to the storage column the specified storage container is to be transferred to.

6 Claims, 5 Drawing Sheets

(30) Foreign Application Priority Data

| | | |
|---|---|---|
| Aug. 2, 2018 | (NO) | 20181039 |
| Dec. 4, 2018 | (NO) | 20181563 |
| Dec. 18, 2018 | (NO) | 20181647 |

(51) Int. Cl.

| | |
|---|---|
| B65G 1/04 | (2006.01) |
| B65G 1/06 | (2006.01) |
| B65G 47/06 | (2006.01) |
| B65G 47/52 | (2006.01) |
| B65G 57/03 | (2006.01) |
| B65G 63/06 | (2006.01) |
| B65G 65/23 | (2006.01) |
| B65G 67/24 | (2006.01) |
| B66F 9/06 | (2006.01) |
| B66F 9/19 | (2006.01) |
| G05D 1/00 | (2006.01) |
| B60W 50/00 | (2006.01) |
| B65G 43/00 | (2006.01) |
| B65G 63/00 | (2006.01) |

(52) U.S. Cl.
CPC ......... *B65G 1/0464* (2013.01); *B65G 1/0471* (2013.01); *B65G 1/0478* (2013.01); *B65G 1/0485* (2013.01); *B65G 1/0492* (2013.01); *B65G 1/065* (2013.01); *B65G 1/1375* (2013.01); *B65G 47/06* (2013.01); *B65G 47/52* (2013.01); *B65G 57/03* (2013.01); *B65G 63/06* (2013.01); *B65G 65/23* (2013.01); *B65G 67/24* (2013.01); *B66F 9/063* (2013.01); *B66F 9/19* (2013.01); *G05D 1/0011* (2013.01); *G05D 1/021* (2013.01); *G05D 1/0291* (2013.01); *B60W 50/0098* (2013.01); *B60W 2710/06* (2013.01); *B60W 2720/10* (2013.01); *B60W 2720/24* (2013.01); *B65G 1/1378* (2013.01); *B65G 43/00* (2013.01); *B65G 63/004* (2013.01); *B65G 2201/0235* (2013.01); *B65G 2201/0258* (2013.01); *B65G 2203/0283* (2013.01); *B65G 2203/042* (2013.01); *G05D 1/02* (2013.01); *G05D 1/0229* (2013.01); *G05D 1/0231* (2013.01); *G05D 1/0259* (2013.01); *G05D 1/0289* (2013.01); *G05D 2201/0216* (2013.01)

(56) References Cited

U.S. PATENT DOCUMENTS

| | | |
|---|---|---|
| 4,538,950 A | 9/1985 | Shiomi et al. |
| 4,909,697 A | 3/1990 | Bernard, II et al. |
| 4,935,871 A | 6/1990 | Grohsmeyer |
| 5,078,566 A | 1/1992 | Ferrence |
| 5,360,306 A | 11/1994 | Nakayama et al. |
| 5,538,809 A | 7/1996 | Bittihn et al. |
| 6,687,568 B2 | 2/2004 | Ohtsuka et al. |
| 7,101,139 B1 | 9/2006 | Benedict |
| 8,628,289 B1 | 1/2014 | Benedict et al. |
| 9,527,669 B1 | 12/2016 | Hanssen et al. |
| 2003/0093176 A1 | 5/2003 | Ohtsuka et al. |
| 2004/0122570 A1 | 6/2004 | Sonoyama et al. |
| 2005/0047895 A1 | 3/2005 | Lert |
| 2005/0118003 A1 | 6/2005 | Mitchell et al. |
| 2008/0014062 A1 | 1/2008 | Yuyama et al. |
| 2009/0136328 A1* | 5/2009 | Schafer ............ B65G 1/026 414/807 |
| 2010/0316470 A1 | 12/2010 | Lert et al. |
| 2011/0027059 A1 | 2/2011 | Benedict et al. |
| 2011/0203231 A1* | 8/2011 | Hortig ............ B65B 67/02 53/235 |
| 2012/0101627 A1* | 4/2012 | Lert ............ B65G 1/1373 700/216 |
| 2012/0282068 A1 | 11/2012 | Tschurwald et al. |
| 2014/0014470 A1 | 1/2014 | Razumov |
| 2014/0086714 A1 | 3/2014 | Malik |
| 2014/0277693 A1 | 9/2014 | Naylor |
| 2014/0288696 A1 | 9/2014 | Lert |
| 2014/0292274 A1 | 10/2014 | Dorval et al. |
| 2014/0311858 A1 | 10/2014 | Keating et al. |
| 2015/0086304 A1* | 3/2015 | Hasman ............ B65G 1/1378 414/269 |
| 2015/0127143 A1* | 5/2015 | Lindbo ............ G05B 15/02 700/218 |
| 2015/0227140 A1 | 8/2015 | Douglas et al. |
| 2016/0009493 A1* | 1/2016 | Stevens ............ B65G 1/1373 700/216 |
| 2016/0060033 A1 | 3/2016 | Izumi |
| 2016/0060037 A1 | 3/2016 | Razumov |
| 2016/0129587 A1* | 5/2016 | Lindbo ............ G06Q 10/087 700/218 |
| 2016/0130085 A1* | 5/2016 | Yamashita ............ B65G 1/1373 414/807 |

(56) References Cited

U.S. PATENT DOCUMENTS

| | | | |
|---|---|---|---|
| 2016/0137435 | A1 | 5/2016 | Tanaka et al. |
| 2016/0145058 | A1* | 5/2016 | Lindbo ............... B65G 1/0457 |
| | | | 700/218 |
| 2016/0176638 | A1 | 6/2016 | Toebes |
| 2016/0325932 | A1* | 11/2016 | Hognaland ......... B65G 1/0478 |
| 2016/0355337 | A1* | 12/2016 | Lert ..................... B65G 1/1378 |
| 2017/0050809 | A1 | 2/2017 | Itoh et al. |
| 2017/0057745 | A1 | 3/2017 | Ueda et al. |
| 2017/0166400 | A1 | 6/2017 | Hofmann |
| 2017/0253430 | A1 | 9/2017 | Buzan et al. |
| 2017/0313514 | A1* | 11/2017 | Lert, Jr. ............... B65G 1/0478 |
| 2017/0362039 | A1* | 12/2017 | Eisenberg ............ B65G 47/46 |
| 2018/0029798 | A1* | 2/2018 | Lindbo ................. B65G 1/137 |
| 2018/0043528 | A1* | 2/2018 | Lindbo ................. B65D 21/02 |
| 2018/0044110 | A1 | 2/2018 | Clarke et al. |
| 2018/0065804 | A1* | 3/2018 | Hognaland ......... B65G 1/0464 |
| 2018/0068253 | A1 | 3/2018 | Simms et al. |
| 2018/0075402 | A1* | 3/2018 | Stadie ................. G05D 1/0289 |
| 2018/0082162 | A1 | 3/2018 | Durham et al. |
| 2018/0086573 | A1 | 3/2018 | Lindbo |
| 2018/0118078 | A1 | 5/2018 | Alkhaldi et al. |
| 2018/0141754 | A1 | 5/2018 | Garrett et al. |
| 2018/0150793 | A1 | 5/2018 | Lert, Jr. et al. |
| 2018/0162639 | A1* | 6/2018 | Ingram-Tedd ....... B65G 1/0464 |
| 2018/0178979 | A1* | 6/2018 | Bretz ................... B65G 1/0407 |
| 2018/0194571 | A1* | 7/2018 | Fryer ................... B65G 1/065 |
| 2018/0237221 | A1* | 8/2018 | Lindbo ................. A62C 35/68 |
| 2018/0244467 | A1* | 8/2018 | Hognaland ......... B65G 1/0464 |
| 2018/0305123 | A1* | 10/2018 | Lert, Jr. ................ G06V 40/20 |
| 2018/0346243 | A1* | 12/2018 | Lindbo ................ B65G 1/1373 |
| 2019/0031399 | A1* | 1/2019 | Shaikh ................. B65D 25/14 |
| 2019/0054932 | A1* | 2/2019 | Stadie .................. B65G 45/24 |
| 2019/0375588 | A1* | 12/2019 | Lindbo ................ B65G 1/0492 |
| 2020/0031575 | A1* | 1/2020 | Hognaland .......... B65G 1/1373 |
| 2020/0148474 | A1 | 5/2020 | Salichs et al. |

FOREIGN PATENT DOCUMENTS

| | | |
|---|---|---|
| CH | 507418 A | 5/1971 |
| CN | 101553416 A | 10/2009 |
| CN | 101711210 A | 5/2010 |
| CN | 102050333 A | 5/2011 |
| CN | 102992012 A | 3/2013 |
| CN | 104066661 A | 9/2014 |
| CN | 104781163 A | 7/2015 |
| CN | 104885106 A | 9/2015 |
| CN | 105383848 A | 3/2016 |
| CN | 105517923 U | 4/2016 |
| CN | 105899398 A | 8/2016 |
| CN | 105947514 A | 9/2016 |
| CN | 106064718 A | 11/2016 |
| CN | 106241154 A | 12/2016 |
| CN | 106414278 A | 2/2017 |
| CN | 106575391 A | 4/2017 |
| CN | 106660703 A | 5/2017 |
| CN | 106662874 A | 5/2017 |
| CN | 106829298 A | 6/2017 |
| CN | 206790852 U | 12/2017 |
| CN | 108140168 A | 6/2018 |
| DE | 40 16 810 C1 | 11/1991 |
| DE | 9310690 U1 | 9/1993 |
| DE | 102009017241 A1 | 10/2010 |
| DE | 102013009340 A1 | 12/2014 |
| EP | 0133472 A2 | 2/1985 |
| EP | 0458021 A1 | 11/1991 |
| EP | 0534558 A1 | 3/1993 |
| EP | 2881905 A1 | 6/2015 |
| EP | 3003932 A1 | 4/2016 |
| EP | 3288865 A1 | 3/2018 |
| GB | 1267751 A | 3/1972 |
| GB | 1 276 160 A | 6/1972 |
| GB | 2106070 A | 4/1983 |
| GB | 2211822 A | 7/1989 |
| GB | 2233319 A | 1/1991 |
| GB | 2557379 A | 6/2018 |
| JP | S60-137703 A | 7/1985 |
| JP | S6417707 A | 1/1989 |
| JP | S6485656 A | 3/1989 |
| JP | H06-043936 A | 2/1994 |
| JP | H07-067623 B2 | 7/1995 |
| JP | H08-217209 A | 8/1996 |
| JP | H09-152914 A | 6/1997 |
| JP | H11-143538 A | 5/1999 |
| JP | 2000-044010 A | 2/2000 |
| JP | 2000191106 A | 7/2000 |
| JP | 2003137406 A | 5/2003 |
| JP | 2009184775 A | 8/2009 |
| JP | 2009-541177 A | 11/2009 |
| JP | 2011-102166 A | 5/2011 |
| JP | 2015-535517 A | 12/2015 |
| JP | 2017088404 A | 5/2017 |
| JP | 2017-524625 A | 8/2017 |
| KR | 20170026074 A | 3/2017 |
| NO | 317366 B1 | 10/2004 |
| RU | 2008111257 A | 10/2009 |
| WO | 9614258 A1 | 5/1996 |
| WO | 2005/077789 A1 | 8/2005 |
| WO | 2010/064989 A1 | 6/2010 |
| WO | 2012/083060 A1 | 6/2012 |
| WO | 2012106746 A1 | 8/2012 |
| WO | 2014/075937 A1 | 5/2014 |
| WO | 2014075937 A1 | 5/2014 |
| WO | 2014/090684 A1 | 6/2014 |
| WO | 2014/195901 A1 | 12/2014 |
| WO | 2014/203126 A1 | 12/2014 |
| WO | 2014195901 A1 | 12/2014 |
| WO | 2015084236 A1 | 6/2015 |
| WO | 2015/140216 A1 | 9/2015 |
| WO | 2015/170660 A1 | 11/2015 |
| WO | 2015/185628 A2 | 12/2015 |
| WO | 2015193278 A1 | 12/2015 |
| WO | 2016/166294 A1 | 10/2016 |
| WO | 2016/166323 A1 | 10/2016 |
| WO | 2016172793 A1 | 11/2016 |
| WO | 2016/198565 A1 | 12/2016 |
| WO | 2016196815 A1 | 12/2016 |
| WO | 2016198467 A1 | 12/2016 |
| WO | 2017/081281 A1 | 5/2017 |
| WO | 2017081273 A1 | 5/2017 |
| WO | 2017/121512 A1 | 7/2017 |
| WO | 2017121515 A1 | 7/2017 |
| WO | 2017/144054 A1 | 8/2017 |
| WO | 2017/153563 A1 | 9/2017 |
| WO | 2017/186825 A1 | 11/2017 |
| WO | 2017/211640 A1 | 12/2017 |
| WO | 2017220651 A1 | 12/2017 |
| WO | 2018/162757 A1 | 9/2018 |

OTHER PUBLICATIONS

Extended European Search Report issued in European Application No. 21186410.3, dated Nov. 25, 2021 (5 pages).

Notification of Reasons for Rejection issued in Japanese Application No. 2020-568727, dated Mar. 30, 2023 (8 pages).

Office Action in counterpart Chinese Patent Application No. 2019800538763 dated Dec. 6, 2021 (13 pages).

Office Action in counterpart Chinese Patent Application No. 2019800393798 dated Dec. 9, 2021 (17 pages).

Office Action issued in the counterpart Chinese Patent Application No. 201980037723X, dated Sep. 17, 2021 (25 pages).

Office Action issued in the counterpart Chinese Patent Application No. 2019800383353, dated Dec. 17, 2021 (3 pages).

Norwegian Serach Report Issued in Corresponding Norwegian Application No. 20181005, dated Feb. 6, 2019 (2 Pages).

International Search Report issued in International Application No. PCT/EP2019/065153, dated Sep. 12, 2019 (5 pages).

Written Opinion issued in International Application No. PCT/EP2019/065153; dated Sep. 12, 2019 (6 pages).

International Search Report issued in PCT/EP2019/065224 dated Sep. 23, 2019 (7 pages).

(56) References Cited

OTHER PUBLICATIONS

Written Opinion of the International Searching Authority issued in PCT/EP2019/065224 dated Sep. 23, 2019 (9 pages).
International Preliminary Report on Patentability from PCT/EP2019/065224 dated Nov. 13, 2020 (16 pages).
Norwegian Serach Report Issued in Corresponding Norwegian Application No. 20181563, dated Apr. 11, 2019 (2 pages).
Norwegian Serach Report Issued in Corresponding Norwegian Application No. 20181039, dated Jun. 6, 2019 (3 pages).
Norwegian Serach Report Issued in Corresponding Norwegian Application No. 20181647, dated May 24, 2019 (2 pages).
International Search Report issued in corresponding PCT/EP2019/065166 dated Sep. 12, 2019 (9 pages).
Written Opinion of the International Searching Authority issued in corresponding PCT/EP2019/065166 dated Sep. 12, 2019 (8 pages).
International Search Report issued in corresponding PCT/EP2019/065233 dated Sep. 12, 2019 (8 pages).
Written Opinion of the International Searching Authority issued in corresponding PCT/EP2019/065233 dated Sep. 12, 2019 (8 pages).
International Search Report issued in corresponding PCT/EP2019/065236 dated Sep. 12, 2019 (8 pages).
Written Opinion of the International Searching Authority issued in corresponding PCT/EP2019/065236 dated Sep. 12, 2019 (8 pages).
Office Action in counterpart Chinese Patent Application No. 201980038106.1 dated Sep. 8, 2021 (6 pages).
Office Action issued in counterpart Japanese Patent Application No. 2020-569128 dated Jul. 3, 2023 (6 pages).
Office Action issued in counterpart Japanese Patent Application No. 2020-568698 dated May 29, 2023 (9 pages).
Office Action issued in counterpart Japanese Patent Application No. 2020-569140 dated Jun. 2, 2023 (5 pages).
Office Action issued in counterpart Japanese Patent Application No. 2020-568714 dated Jul. 3, 2023 (16 pages).
Office Action issued in counterpart Japanese Patent Application No. 2020-568805 dated Jun. 5, 2023 (7 pages).
Office Action in counterpart Chinese Patent Application No. 201980039028.7 dated Oct. 27, 2021 (15 pages).
Office Action in counterpart Chinese Patent Application No. 201980039046.5 dated Sep. 15, 2021 (18 pages).
Office Action in counterpart Chinese Patent Application No. 201980039068.1 dated Sep. 15, 2021 (23 pages).
Office Action in counterpart Chinese Patent Application No. 201980038856.9 dated Oct. 19, 2021 (16 pages).
United States Office Action in related U.S. Appl. No. 16/972,482, daed Mar. 22, 2022 (46 pages).
Office Action issued in counterpart Chinese Application No. 201980039066.2 dated Sep. 10, 2021 (10 pages).
Search Report issued in counterpart Chinese Application No. 201980039066.2 dated Sep. 6, 2021 (3 pages).
Office Action issued in counterpart Japanese Patent Application No. 2020-568712 dated Jun. 26, 2023 (7 pages).
Office Action issued in the European Application No. 19730155.9, dated Sep. 4, 2023 (6 pages).

* cited by examiner

METHOD AND SYSTEM FOR CONTROLLING THE OPERATION OF CONTAINER HANDLING VEHICLES AND DRONES SERVING AN AUTOMATED STORAGE AND RETRIEVAL SYSTEM

INTRODUCTION

The present invention relates to an automated storage and retrieval system having a grid structure and a delivery system comprising ports located at a first location at the lower part of the automated storage and retrieval system. Drones are used for transporting storage containers to and from the ports and a second location, typically a picking station. More specifically the invention relates to a method, system and computer program for controlling and coordinating interaction between drones and container handling vehicles operating respectively below and on top of the automated storage and retrieval system.

BACKGROUND

FIG. 1 discloses a typical prior art automated storage and retrieval system 10 having a framework structure 100 and where container handling vehicles 200, also called robots, are operating the automated storage and retrieval system 10 when running on a rail system 108 on top of the framework structure 100.

The framework structure 100 comprises a plurality of upright members 102 and optionally a plurality of horizontal members 103 supporting the upright members 102. The members 102, 103 may typically be made of metal, e.g. extruded aluminium profiles.

The framework structure 100 defines a storage grid 104 comprising storage columns 105 arranged in rows, in which storage containers 106, also known as bins, are stacked one on top of another to form stacks 107. Each storage container 106 may typically hold a plurality of product items (not shown).

The automated storage and retrieval system 10 comprises rail system 108 for container handling vehicles 200. The rail system 108 is arranged in a grid pattern across the top of the storage grid 104. Container handling vehicles 200 are running on the rail system 108 and operated to lower and raise storage containers 106 into and from the storage columns 105 as well as transporting the storage containers 106 on the rail system 108. The horizontal extent of one of the grid cells 122 constituting the grid pattern is marked by thick lines in FIG. 1.

The rail system 108 comprises a first set of parallel rails 110 arranged to guide movement of the container handling vehicles 200 in a first direction X across the top of the frame structure 100, and a second set of parallel rails 111 arranged perpendicular to the first set of rails 110 to guide movement of the container handling vehicles 200 in a second direction Y which is perpendicular to the first direction X. In this way, the rail system 108 defines grid columns above which the container handling vehicles 200 can move laterally above the storage columns 105, i.e. in a plane which is parallel to the horizontal X-Y plane.

Each container handling vehicle 200 comprises a vehicle body and a wheel arrangement of eight wheels 201 where a first set of four wheels enable the lateral movement of the container handling vehicles 200 in the X direction and a second set of the remaining four wheels enable the lateral movement in the Y direction. One or both sets of wheels in the wheel arrangement can be lifted and lowered, so that the first set of wheels and/or the second set of wheels can be engaged with respective set of rails 110, 111, where this is defined by a controller controlling movements and directions of a container handling vehicle 200.

Each container handling vehicle 200 comprises a lifting device (not shown) for vertical transportation of storage containers 106, e.g. raising a storage container 106 from, and lowering a storage container 106 into, a storage column 105. The lifting device comprises one or more gripping/engaging devices (not shown) adapted for engaging a storage container 106. The gripping/engaging devices can be lowered from the vehicle 200 by the lifting device for adjusting the position of the gripping/engaging devices in a third direction Z which is orthogonal the first and second directions X, Y.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 200 may have a cantilever construction, as is described in NO317366, the contents of which are also incorporated herein by reference.

In a storage grid 104, most of the grid columns are storage columns 105, i.e. grid columns 105 where storage containers 106 are stored in stacks 107. However, a storage grid 104 normally has at least one grid column which is not used for storing storage containers 106, but instead is used by the container handling vehicles 200 for dropping off and/or picking up storage containers 106 so that they can be transported to a second location (not shown) where the storage containers 106 can be accessed from the outside of the storage grid 104 or transferred out of or into the storage grid 104. Within the art, such a location is normally referred to as a "port" and the grid column in which the port is located may be referred to as a "delivery column" 119. The drop-off and pick-up ports of the container handling vehicles 200 are referred to as the "upper ports of a delivery column" 119. While the opposite end of the delivery column is referred to as the "lower ports of a delivery column".

The storage grids 104 in FIG. 1 comprise two delivery columns 119 and 120. The first delivery column 119 may for example comprise a dedicated drop-off port where the container handling vehicles 200 can drop off storage containers 106 to be transported through the delivery column 119 and further to an access or a transfer station (not shown), and the second delivery column 120 may comprise a dedicated pick-up port where the container handling vehicles 200 can pick up storage containers 106 that have been transported through the delivery column 120 from an access or a transfer station (not shown). Each of the ports of the first and second delivery column 119, 120 may comprise a port which is suitable for both pick-up and drop-off storage containers 106.

The second location may typically be a picking or a stocking station where product items are removed from or positioned into the storage containers 106. In a picking or a stocking station, the storage containers 106 are normally never removed from the automated storage and retrieval system 10 but are returned into the storage grid 104 once accessed. For transfer of storage containers out of, or into the storage grid 104, there are also lower ports provided in a delivery column. Such lower ports are for example used for transferring storage containers 106 to another storage facility (e.g. to another storage grid), directly to a transport vehicle (e.g. a train or a lorry), or to a production facility.

For monitoring and controlling the automated storage and retrieval system 10, the system comprises a control system (not shown) which typically is computerized and comprises a database for keeping track of the storage containers 106 and which bins to be handled at any time, i.e. which bins to be retrieved or stored. The control system may monitor and control the location of respective storage containers 106 within the storage grid 104; the content of each storage container 106; and positions and movements of the container handling vehicles 200 so that a desired storage container 106 can be delivered to the desired location at the desired time without the container handling vehicles 200 colliding with each other.

When a storage container 106 stored in the storage grid 104 disclosed in FIG. 1 is to be accessed, a control system instructs one of the container handling vehicles 200 to retrieve the storage container 106 from its current position in the storage grid 104 and to transport it to or through the first delivery column 119. This operation involves moving the container handling vehicle 200 to a grid location above the storage column 105 in which the target storage container 106 is positioned, retrieving the storage container 106 from the storage column 105 using the container handling vehicle's lifting device (not shown), and transporting the storage container 106 to the first delivery column 119. If the target storage container 106 is located deep within a stack 107, i.e. with one or a plurality of other storage containers positioned above the target storage container 106, the operation will include temporarily moving the above-positioned storage containers 106 prior to lifting the target storage container 106 from the storage column 105. This step, which is sometimes referred to as "digging" within the art, may be performed with the same container handling vehicle 200 that is subsequently used for transporting the target storage container 106 to the delivery column, or with one or a plurality of other cooperating container handling vehicles 200. Alternatively, or in addition, the automated storage and retrieval system 10 may have container handling vehicles 200 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers may alternatively be relocated to other storage columns 105.

When a storage container 106 is to be stored in the storage grid 104, one of the container handling vehicles 200 is instructed to pick up the storage container 106 from the second delivery column 120 and to transport it to a grid location above the storage column 105 where it is to be stored. After any storage containers positioned at or above the target position within the storage column stack 107 have been removed, the container handling vehicle 200 positions the storage container 106 at the desired position. The removed storage containers may then be lowered back into the storage column 105 or relocated to other storage columns 105.

A problem associated with known automated storage and retrieval systems 10 is that the area surrounding the pick-up and drop-off ports may become congested with container handling vehicles 200 that are instructed to drop off or pick up storage containers 106. This may seriously impede the operation of the automated storage and retrieval system 10. In small systems this situation may possibly be alleviated by adding delivery columns to the grid, as this will allow the container handling vehicles 200 to be distributed among a larger number of ports of delivery columns thereby avoiding congestion. However, if ports and columns are added, the conveyor system infrastructure must normally be increased. This requires space, which may not necessarily be available. Also, adding and maintaining a conveyor system infrastructure is costly.

Another problem with prior art automated storage and retrieval systems 10 is that the separate drop-off ports and pick-up ports of the delivery columns 119, 120 require the container handling vehicles 200 to move to a storage column 105 after drop-off to retrieve a new storage container 106 Likewise, container handling vehicles 200 must be unloaded, i.e. they must be without of a storage container 106 when they are sent to a pick-up port 120 to pick up a storage container 106. This results in an inefficiency and causes increased congestion around the ports, as container handling vehicles 200 are moving around on the storage grid 104 without a storage container 106 as payload. In addition, the delivery columns 119, 120 may take up space on the storage grid 104 which could be used for other purposes such as support for container handling vehicles 200 passing the columns 119, 120.

The present invention provides a new method avoiding said problems when handling and transferring storage containers 106 to and from an automated storage and retrieval system.

SUMMARY OF THE INVENTION

The invention is defined by a method for controlling the operation of container handling vehicles and remotely operated drones such that total elapsed time or waiting time cost for transferring storage containers between them is minimal or optimal based on a weighting function, where the drones are operating at a level below an automated storage and retrieval system having a framework structure defining a storage grid for storing storage containers in grid cells, and where the storage containers are stored and retrieved by container handling vehicles running on top of the storage grid.

The following steps are performed by at least one operational controller which is in communication with a first type of controller in each container handling vehicle and a second type of controller in each drone:

when a specified storage container is to be transferred from a storage column and its corresponding grid cell to a drone:
assigning and instructing a container handling vehicle to pick up the storage container from the grid cell and lower it to a selected port, located at the lower end of an identified free delivery column by transmitting instructions to the first type of controller of the assigned container handling vehicle;
moving the container handling vehicle to the grid cell, picking up the storage container and transporting it to a grid cell of the delivery column where the port is;
transmitting a signal to the drones comprising information of the selected port at the first location and when the storage container will be available at the port;
based on responses from the drones, assigning and instructing a drone to retrieve the specified storage container, moving the drone to the port at the first location, picking up the storage container and bringing it to a second location, and/or when a specified storage container is to be transferred to a grid cell, for storage in its corresponding storage column, by a drone:
determining which port at the first location that is to be used,
transmitting instructions to the second type of controller of the drone, to transport the storage container from its current location, representing the second location, to said port at the first location,
moving the drone from the second location to the port at the first location,
transmitting a signal to the container handling vehicles comprising information of the port to retrieve the storage container from,
based on responses from the container handling vehicles, assigning and instructing a container handling vehicle to lift and retrieve the specified storage container from the said port at the first location,
lifting the storage container from the port through the delivery column and moving the container handling vehicle for transporting the storage container to the grid cell corresponding to the storage column the specified storage container is to be transferred to.

Depending on the size of the storage grid, the number of ports for transferring storage containers between container handling vehicles and drones may vary. For smaller systems, only two ports may be allocated for this purpose, e.g. one used for lowering a retrieved storage container and one used for lifting a storage container to be stored. Different configurations are feasible and can be customized according to the size of the storage grid and the available area below the storage grid where the drones are operating.

If there are several available ports for transferring storage containers, the best suited port used can be decided. Ports can be grouped together below delivery columns in an allocated area below a storage grid, or they may be scattered at different places below the storage grid.

In one embodiment, where, when a specified storage container is to be transferred to or from a grid cell by the drone and the container handling vehicle, the port selected from a set of ports available for transferring the storage container is based on a trade-off of the best matching travel time for the container handling vehicle between closest available port and the grid cell where the storage container is to be transferred to or from, and the location of a port accessible by closest free drone.

Travel times for available container handling vehicles will be calculated. This will be based on their current location and routes they can take for reaching the grid cell where a specific storage container is to be stored in or to retrieved from, and the time it will use to the cells where the available ports are.

Travel times for available drones will also be calculated based on their current location and routes they can take for reaching the port where a specific storage container is to be transferred to and from a container handling vehicle, and the time the will use to the cells where the available ports are.

The port selected for transferring a storage container will then be based on a trade-off of the container handling vehicle and the drone having the best matching travel time to the port. The objective is to choose the port resulting in the shortest time used for transferring a specified storage container to and from the storage grid by a drone and container handling vehicle. In addition to this, optimal timing is achieved when there is minimal waiting at a port when transferring storage containers.

This means that a storage container is transferred via a port without a container handling vehicle or drone having to wait for each other.

When retrieving a specified storage container, aspects contributing to the elapsed time for when its ready to be transferred to a drone at a port are the time used to move from its current location to the grid cell where the storage container is stored, the time used to pick it up, the time used to move it to the grid cell where the port is as well as the time used for lowering it to the port.

Retrieving a storage container may include digging it up, i.e. first removing other containers on top of it before having access to it. This operation may be performed by other container handling vehicles than the one selected for transferring it to a port such that a specific storage container is available when a selected container handling vehicle arrives at the cell where the storage container is located.

In one embodiment, where, when a specified storage container is to be transferred to a grid cell by the drone and the container handling vehicle, the container handling vehicle assigned for retrieving the specified storage container from the said port at the first location is the one which is currently available and will have the best matching travel time, in view of the drone, from its current location to the port.

In another embodiment, when a specified storage container is to be retrieved from a grid cell by the container handling vehicle and the drone, the drone assigned for retrieving the specified storage container from the said port at the first location is the one which is currently available and will have the best matching travel time, in view of the container handling vehicle, from its current location to the port.

The invention further comprises a system for enabling controlling operation of container handling vehicles, running on top of the storage grid, and remotely operated drones, operating at a level below an automated storage and retrieval system, such that total elapsed time or waiting time cost for transferring storage containers between them is minimal or optimal based on a weighting function.

The system comprises an operational controller that is signal connected to controllers in all robots and all drones. In this way, the operational controller will always have an overview and control of locations and availability of robots and drones. The interaction of the controllers enables to perform the method described above.

The invention further comprises a computer program that when executed by a computer performs the method described above for controlling the operation of remotely operated drones such that total elapsed time or waiting time cost for transferring storage containers between them is minimal or optimal based on a weighting function, where the drones are operating at a level below an automated storage and retrieval system having a framework structure defining a storage grid for storing storage containers in grid cells, and where the storage containers are stored and retrieved by container handling vehicles running on top of the storage grid.

An advantage of the invention is that it provides optimal control of the new automated storage and retrieval system comprising both container handling vehicles and drones. This means increased efficiency when storing and retrieving items within storage containers.

BRIEF DESCRIPTION OF THE DRAWINGS

The following drawings depict exemplary embodiments of the present invention and are appended to facilitate the understanding of the invention.

DETAILED DESCRIPTION OF THE INVENTION

Figure 1:
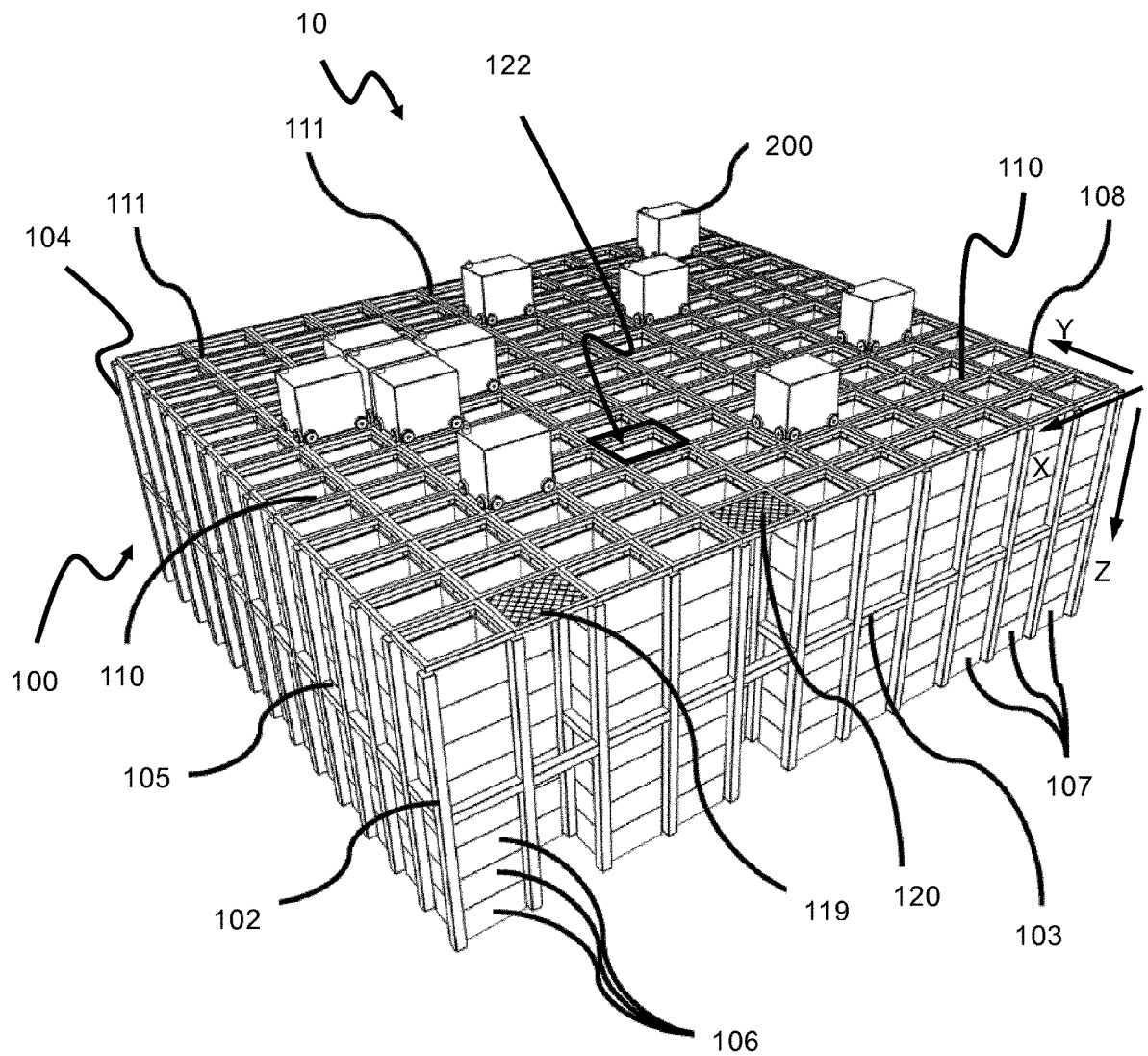
FIG. 1 is perspective view of a prior art automated storage and retrieval system with operable prior art container handling vehicles.

In the following, the invention will be discussed in more detail with reference to the appended drawings. It should be understood, however, that the drawings are not intended to limit the invention to the subject-matter depicted.

A typical prior art automated storage and retrieval system 10 with a framework structure 100 was described in the background section above.

The container handling vehicle rail system 108 allows the container handling vehicles 200 to move horizontally between different grid locations, where each grid location is associated with a grid cell 122.

In FIG. 1, the storage grid 104 is shown with a height of eight grid cells 122. It is understood, however, that the storage grid 104 can in principle be of any size. The storage grid 104 can be considerably wider and/or longer than disclosed in FIG. 1. For example, the storage grid 104 may have a horizontal extent of more than 700×700 storage columns 105. Also, the storage grid 104 can be considerably deeper than disclosed in FIG. 1. For example, the storage grid 104 may be more than twelve grid cells 122 deep, i.e. in the Z direction indicated in FIG. 1.

The container vehicles 200 can be of any type known in the art, e.g. any one of the automated container handling vehicles disclosed in WO2014/090684 A1, in NO317366 or in WO2015/193278A1. The method and control system for controlling said prior art system are known.

The applicant has developed a new solution for operating an automated storage and retrieval system for solving or at least mitigating one or more of the problems related to use of prior art storage and retrieval systems.

In this system, shown in FIG. 2, specialized container handling vehicles called drones 30 are working in an area below the automated storage and retrieval system 10. For efficient handling of storage containers 106, drones 30 must co-operate with the container handling vehicles 106 running on top of the automated storage and retrieval system 10.

A drone 30 differs from a container handling vehicle 200 by constructional features, and the way it handles a storage container 106. A container handling vehicle 200 handles a storage container 106 by lifting and lowering it below its lower parts, while a drone 30 delivers and receives a container 106 above its upper parts.

Figure 2:
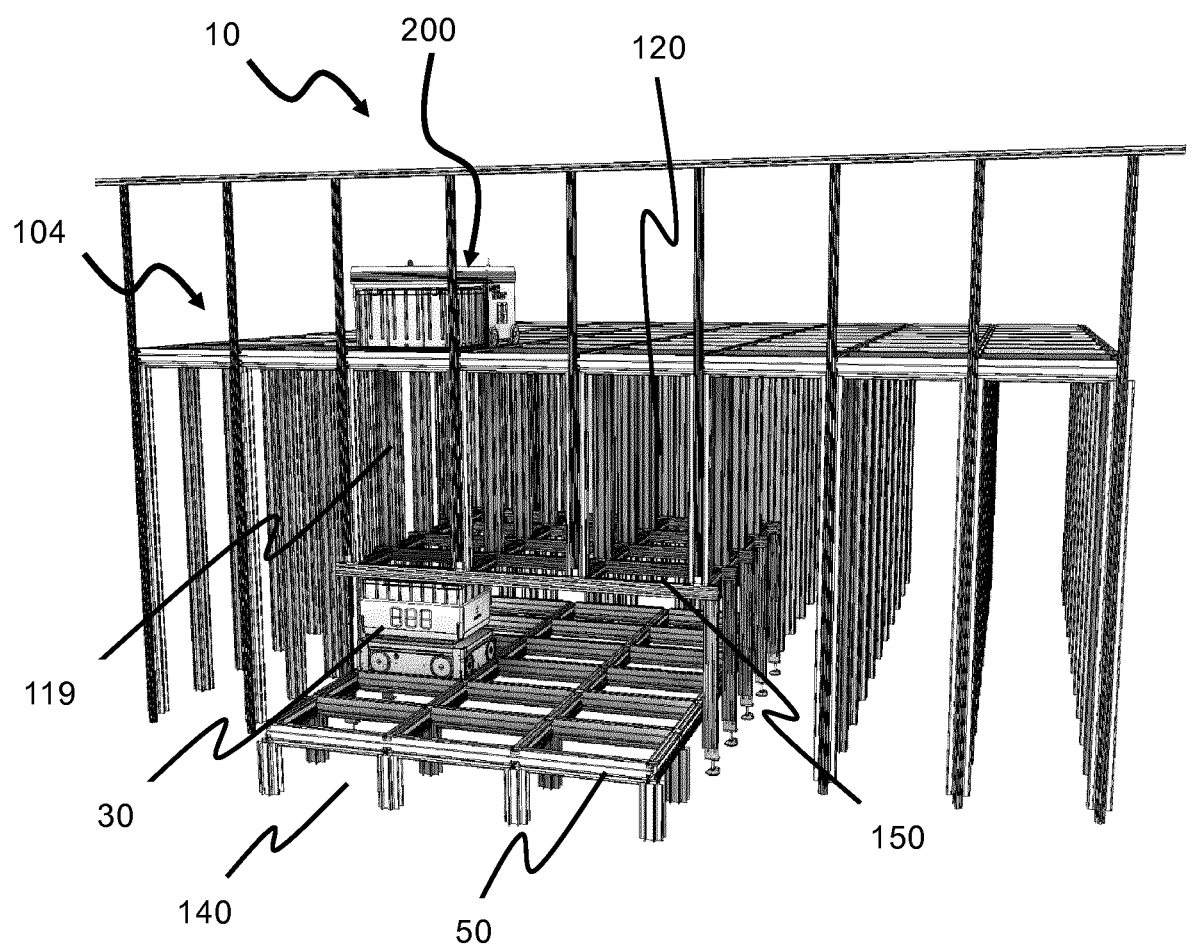
FIG. 2 is a perspective view of an exemplary embodiment of an automated storage and retrieval grid and a delivery system comprising drones according to the present invention.

FIG. 2 shows a perspective view of the new automated storage and retrieval system 10. In addition to container handling vehicles 200 configured to move on the rail system 108 above the storage columns 105, the new system further comprises a delivery system 140 which comprises one or more drones 30. The drones 30 are configured to receive and support one or more storage containers 106 for transport between one or more delivery columns 119, 120 and one or more predetermined positions outside the storage grid 104. The predetermined positions may for example be a second location or a conveyor line or a transport vehicle such as a truck.

In the embodiment shown in FIG. 2, a drone 30 has a container carrier arrangement on its top side. In this way a drone 30 can receive and deliver a container 106 when it is positioned directly below a delivery column 119, 120. The drone shown in FIG. 2 further comprises wheels adapted for running on tracks as well as propulsion means, controller, communication means and power source.

The new system comprises a storage grid 104 and a delivery system 140 located below the storage grid 104. The example in FIG. 2 shows a delivery rail system 50. To get the most storage space for storage containers in the storage and retrieval grid, it may be advantageous to arrange the delivery rails system 50 such that it extends as little as possible into the storage grid 104. This means that the storage and retrieval grid may comprise a plurality of storage columns 105 extending from the upper level to the base of the storage grid 104, thus allowing the greatest possible storage capacity since the entire storage column 105 may be used for storage.

The delivery rail system may comprise a first rail system located within the framework structure of the storage grid 104, and a second rail system located outside the framework structure of the storage grid 104, and wherein the first and second rail system are connected such that a drone 30 can operate between said rail systems.

Rails are not essential for the new system to be fully functional. Drones 30 may for instance run directly on a floor or hover above a floor.

The storage grid 104 in said new solution is equal or similar to the prior art storage grid 104 described above, i.e. a storage grid 104 comprising a rail system 108; a plurality of stacks 107 of storage containers 106, a plurality of container handling vehicles 200 for lifting and moving storage containers 106 stacked in the stacks 107 and delivery columns 119, 120 configured for transferring storage containers 106 between an upper and lower port in each delivery column by means of a container handling vehicle 200.

The delivery system 140 may, as exemplified in FIG. 2, further comprise a delivery rail system 50 situated below a delivery port 150 of the one or more delivery columns 119, 120. The delivery rail system 50 may be constructed in the same way or a similar way as the rail system 108 for the container handling vehicles 200.

The delivery system 140 may further comprise an interface connectable to a third-party storage, production and distribution system. The delivery system 140 may also be integrated with a third-party storage, production and distribution system such that storage containers 106 is transported between the delivery system 140 and the third-party storage, production and distribution system. The delivery system 140 may further be connectable to a third-party storage, production and distribution system such as production facility, a storage grid, assembling facility, reception or shipping location, etc. The connection may be made by means of a connectable rail system or a conveyor system comprising conveyors employed to transport the storage containers 106 between the delivery system 140 and the third-party storage, production and distribution system.

The delivery rail system 50 can be fully or partly integrated into the storage grid 104. However, it is considered advantageous for ensuring an effective operation that the delivery rail system 50 has a horizontal extent that covers a delivery port 150 at the bottom of at least one of the delivery columns 119, 120.

FIG. 2 is a perspective view of an automated storage and retrieval system with a delivery rail system 50 extending from a location inside the storage grid 104 to a location outside the storage grid 104. One or more second locations, i.e. a structure for picking and placing items in the storage containers 106, may be arranged somewhere at the periphery of the part of the delivery rail system 50 located outside the storage grid 104. Alternatively, or in addition, a conveyor may be arranged at or near the same periphery of the delivery rail system 50.

The new system provides a challenge related to optimal coordination when transferring storage containers 106 between container handling vehicles 200 and drones 30 operating at different levels in the automated storage and retrieval system 10.

One object of the invention is to provide a method for controlling the new automated storage and retrieval system 10 for increasing availability of a delivery column 119, 120 for container handling vehicles 200 operating on a rail system. This is achieved by a method for controlling and coordinating interaction between drones 30 and container handling vehicles 200 operating respectively below and on top of the automated storage and retrieval system.

When using and controlling container handling vehicles 200 and drones 30 for transferring storage containers 106, the present invention provides an automated storage and retrieval system that is controlled in a more efficient way than prior art systems thereby avoiding or at least reducing congestion of storage containers 106 around a delivery column 119, 120.

According to the new method, storage containers 106 are transferred between container handling vehicles (robots) 200 and drones as time- and/or cost-efficient as possible.

The most time-efficient method is to minimize the total elapsed time for transferring storage containers 106 between a container handling vehicle 200 and a drone 30, i.e. where each has minimal waiting time. This is achieved when a container handling vehicle 200 and drone 30 each has the best batching travel time when transferring a storage container 106 between them. Ideally, this means that each arrive at a port 150 at the same time.

Waiting time cost for a container handling vehicle 200 is however normally higher than for a drone 30. The most cost-efficient method is to ensure that a container handling vehicle 200 is always occupied handling a storage container 106. This may imply that a drone 30 selected for transferring a storage container 106 to or from the container handling vehicle 299 must wait some time at a port before a container handling vehicle 200 is ready for transferring a storage container 106 at the port 150.

Minimal or optimal waiting cost can be based on a weighting function where a selected port 150, time and waiting cost are variables included in the function.

Drones 30 are moving between a first and a second location in the area below the automated storage and retrieval system 10.

The first location is defined at a level below said automated storage and retrieval system 10 having a grid structure for storing storage containers 106 in grid cells 122 and where storage containers 106 are handled by container handling vehicles 200 running on top of the storage grid 104 and adapted for transferring storage containers 106 via delivery columns 119, 120. More specifically the first location is a location at a the 150 directly below a delivery column 119, 120.

The second location is a location where a drone 30 currently is. This may for instance be a picking or a stocking station where product items are removed from or positioned into the storage containers 106. It may also be a temporary location where a drone is located when waiting for instructions regarding which delivery column 119, 120 it shall interact with for delivering or retrieving a storage container 106.

The different steps of the method are performed in at least one operational controller 210 which is in electronic communication with a first controller 220 in each container handling vehicle 200 and to a second controller 230 in each drone 30.

The at least one operational controller 210 is, in one embodiment, a master controller which is in communication with the first type of controller 220 in each container handling vehicle 200 and the second type of controller 230 in each drone 30.

In another embodiment, the at least one operational controller 210 is a master controller signal connected to sub-controllers that are in communication with the first type of controller 220 in each container handling vehicle 200 and a second type of controller 230 in each drone 30. In this way the master controller can delegate controlling of container handling vehicles 200 and drones 30 to the sub-controllers. The master controller may for instance select a port 150 to be used for transferring a storage container 106 and an estimated target time for transferring based on information from underlying systems. The sub-controllers can then assign and select the container handling vehicle 200 and drone 30 to be used for transferring a storage container 106 at the port 150.

In one scenario, when a specified storage container 106 is to be transferred from storage to a drone 30, the first step is to determine which storage column 105 and corresponding grid cell 122 the specified storage container 106 is stored in. The operational controller 210 then determines which container handling vehicle 200 shall be assigned for the job. It then sends instructions to a first controller 220 in the selected container handling vehicle 200 instructing it to pick up the storage container 106 from the determined grid cell 122 and to lower it to a selected port 150, which is placed at the lower end of an identified free storage column 105 and its corresponding grid cell 122. This will be the first delivery column 119 described above.

If the specified storage container 106 is located below a stack of other storage containers 106 in the same storage column 105, the other storage containers 106 are first removed, either by said assigned container handling vehicle 200 or other container handling vehicles 200 assigned for this operation.

The selected port 150 is normally a port 150, or a set of ports 150 allocated for transferring storage containers 106 from container handling vehicles 200 operating on top of the storage grid 10, to drones 30 operating at a level below the container handling vehicles 200. This level may correspond to the example shown in FIG. 2.

In another embodiment, a selected port 150 may change according to a current free delivery column 119. Determining which port 150 that currently is best suited to be used may be advantageous for bigger systems where a lot of container handling vehicles 200 and drones 30 are operating same automated storage and retrieval system 10.

In one embodiment, the port 150 selected for transferring of a storage container between a container handling vehicle 200 and a drone 30 is based on a trade-off of the closest free grid cell 122 and corresponding free delivery column 119 having a delivery port 150, and the grid cell 122 corresponding to the storage column 105 where the storage container 106 is stored.

All decisions related to which container handling vehicle 200 and drone 30 to use for handling a specific storage container 106 are based on timing information. Said trade-off will be adjusted such that there will be minimal waiting times for a container handling vehicle 200 and a drone 30 when transferring a storage container 106 between them. Ideally, this means that a drone 30 arrives for pick-up at a port 150 about the same time a storage container 106 is lowered to a port 150 by a container handling vehicle 200.

In addition to the said minimal waiting time at a port 150, another aspect considered is utilizing a delivery column 119 as efficient as possible. This means that once a storage container has been transferred via the delivery column, another storage container is transferred. Since the operational controller has the full overview of which containers to be transferred via ports 150 as well as the order, it will continuously choose and rank container handling vehicles 200 for handling storage containers 106 such that once a delivery column 119 is free after transferring a storage container, a new transferring is performed.

By efficient utilization of delivery columns 119, fewer of them must be installed in a storage grid 104, thereby providing more storage capacity.

When a specific storage container 106 is requested to be retrieved, the time it takes to retrieve it will be estimated, and which container handling vehicle 200 that is available for picking it up is decided. The time it takes for retrieving a container 106 is based on its position in a stack of the storage containers 106, and availability of container handling vehicles 200 for retrieving it. If a requested storage container 106 is located below other storage containers 106 in a storage column 105, the other storage containers 106 must first be removed. This will affect the time it takes to retrieve the storage container 106 from its location in a storage column 105.

When the container handling vehicle 200 has retrieved the storage container 106, the time it takes for moving it to a selected cell 122 and lowering it to a corresponding port 150 is decided. The total time for retrieving a storage container 106 from its location in a storage column 105 to delivering it at a port 150 is input data for selecting which drone 30 to select for picking it up.

When instructions are transmitted from the operational controller 210 to the first controller 220 of the assigned container handling vehicle 200, a request is further transmitted to the second controllers 230 in each drone 30 with information of the selected port 150 at the first location where a storage container 106 is to be exchanged as well as estimated time for when the storage container is expected to arrive at the port 150. Drones 30 that are available for picking up a storage container 106 at said estimated time will then report this to the operational controller 210. This may be drones 30 that are currently not handling a storage container 106, or drones 30 that are currently returning storage containers to be stored in the automated storage and retrieval system 10.

In one embodiment, timing information related to an expected arrival time of a storage container 106 at a specific port 150 is provided to the drones once a specific storage container 106 is requested and the total time for delivering it at a port 150 has been estimated.

In another embodiment, updated timing information related to arrival time of a storage container 106 at a port 150 is continuously estimated and transmitted to the drones. Since the traffic of different container handling vehicles 200 running on the rail system 108 on the storage grid 104 can be complex and constantly change, this may provide a more flexible an accurate way of controlling the drones 30 for providing minimal waiting time for picking up a storage container 106 at a port 150.

Based on responses from the drones 30, the operational controller 210 will assign a specific drone 30 to retrieve the specified storage container 106 from the first location at the port 150 and bring it to the second location. The second location may for instance be a picking station as described above. Which drone 30 that is assigned for picking up the storage container 106 will depend on different factors such as the location of a drone 30 when being requested, the task a drone currently is performing etc.

In another scenario, when a specified storage container 106 is to be stored in a storage column 105 by first transferring it to a port 150 by a drone 30, the first step is to determine which port 150 at the first location the storage container 106 is to be transferred to.

As mentioned above, the port 150 is normally pre-defined when setting up the system. In the examples shown in FIGS. 1 and 2 and the corresponding description above, the port 150 at the second delivery column 120 is used for transferring a storage container 106 from a drone 30 to a container handling vehicle 200.

The operational controller 210 will always have the superior overview and control of movements and operations of all container handling vehicles 200, drones 30 and storage containers 106 within the system. It will therefore know which drone 30 that is to transfer a specific storage container 106 to a port 150.

The next step of the method is transmitting instructions from the operational controller 210 to the second controller 230 in the drone 30 to transfer the storage container 106 from its current location, representing the second location, to the selected port 150 at the first location.

The last step is to assign a container handling vehicle 200 to retrieve the specified storage container 106 from the said port 150 at the first location. It will then transfer it to the determined grid cell 122.

One specific scenario provides an efficient way of utilizing a drone 30. In this scenario, a drone 30 is instructed to first transfer a storage container 106 from the second location to the first location at a port 150 at the corresponding second delivery column 120. The drone 30 is then instructed to immediately pick up another storage container 106 from the port 150 at the corresponding first delivery column 119.

In one embodiment of the invention, an operational controller 210 may control the speed of the drones 30 and container handling vehicles 200 based on how fast a person and/or robot arm is picking/placing items from/in storage containers 106 at a picking station. In this way different picking stations can be operated with different speeds. This will ensure a smooth handling of storage containers 106 and will avoid congestion of drones 30 at a specific picking station.

In the following example, a scenario is described where a container handling vehicle 200 is performing an exchange of storage containers 106. When a storage container 106 is to be retrieved from storage in the automated storage and retrieval system 10, the container handling vehicle 200 performs a storage container exchange by returning one storage container 106 to the automated storage and retrieval system 10 for every storage container 106 that is delivered to a drone 30. This involves that the operational controller 210, signals to the container handling vehicle 200 that it must prepare for receiving another storage container 106 immediately after delivery of a storage container 106. This could involve that the container handling vehicle 200 is not lifting its lifting device all the way to the top of a cell 122, but only enough to be free from the storage container 106 it is transferring to a drone 30 to. A second drone 30, carrying a storage container 106 to be returned for storage will then line up beside the drone 30 that is receiving a storage container 106, and move into position immediately after the first drone 30 has moved away. The same container handling vehicle 200 can then quickly pick up the returned storage container 106 and place it back in the automated storage and retrieval system 10.

In another scenario, where a storage container 106 is to be returned to the storage grid 104 without an exchange of storage containers 106, the operational controller 210 will transmit a signal to the controllers of a selected container handling vehicle 200, that currently is not handling a storage container 106, that a drone 30 needs the container handling vehicle 200 to move to a specific grid cell 122 or to a selected grid cell 122 out of a selection of grid cells 122. The controller of the selected container handling vehicle 200 will then instruct it to move to the given grid cell 122, or to a grid cell 122 in a selection of grid cells 122 that it can reach most efficiently. The port 150 corresponding to the selected grid cell 122 is then communicated by the operational controller 210 to the controller of the drone 30 returning the storage container to the storage grid 104 and the drone 30 will start its movement to the selected port 150. The container handling vehicle 200 will, once it has moved to the selected grid cell 122, lower its lift device to right above where the drone operates, i.e. at port 150, so that it is ready to pick up the storage container 106 immediately upon the drone's 30 arrival to the selected port 150.

As understood from the discussion above, the operational controller 210 controls and coordinates operations of container handling vehicle 200 and drones 30. Ideally, there is a minimal waiting time for a container handling vehicle 200 and a drone 30 when transferring a storage container 106 between them. To achieve this, coordination of operations of container handling vehicles 200 and drones 30 is performed. This is based on timing information.

There will be different operations contributing to elapsed times for container handling vehicles 200 and drones 30 when handling storage containers 106. When a storage container 106 is requested to be retrieved from a storage column 105, the first operation is to decide which of the container handling vehicles 200 that is going to pick it up and then the time it takes to move the selected container handling vehicle 200 from its current position to the cell 122 corresponding to the storage column 105 where the requested storage container 106 is stored. Which container handling vehicle 200 that is selected will depend on positions of the container handling vehicles 200 on the grid and the different routes they can take for reaching the cell 122 above the requested storage container 106.

If a route is a straight line along the rails, then the time to reach the destination cell 122 will be governed by the acceleration, top speed and deceleration of the vehicle. If a zigzag route needs to be taken, then in addition to these factors, the time required to lower and raise a second set of wheels and travel in perpendicular directions will also contribute to the decision about which container handling vehicles 200 that is optimal for retrieving a requested storage container 106.

The next operation may involve first removing other storage containers 106 placed on top of the requested storage container 106. This digging operation may contribute to a major amount of time depending on at which level below a top most storage container 106 the requested storage container 106 is located. A digging operation may be performed by other container handling vehicles 200 than the one selected to bring the storage container 106 to a port 150. In this way the requested storage container 106 may be ready to be picked up when the selected container handling vehicle 200 has arrived at its location.

The next operation is to bring the storage container 106 from the cell 122 corresponding to the storage column 105 it is retrieved from to a selected cell 122 of a selected storage column 105 with a port 150. The last step contributing to the total elapsed time from a storage container 106 is requested until it is available at the port 150 is to lower the storage container 106 to the port 150.

The different time estimates are based on experience data and operation speeds of the selected container handling vehicle 106. An estimated total time for when a requested storage container 106 is available at a port 150 is an input value when the operational controller initiates a transmission to the drones 30 with information of a selected port 150 at the first location, and the time a requested storage container is ready to be picked up at the port 150. As described above, the estimated total time can be updated continuously and transmitted to the drones 30.

Figure 3:
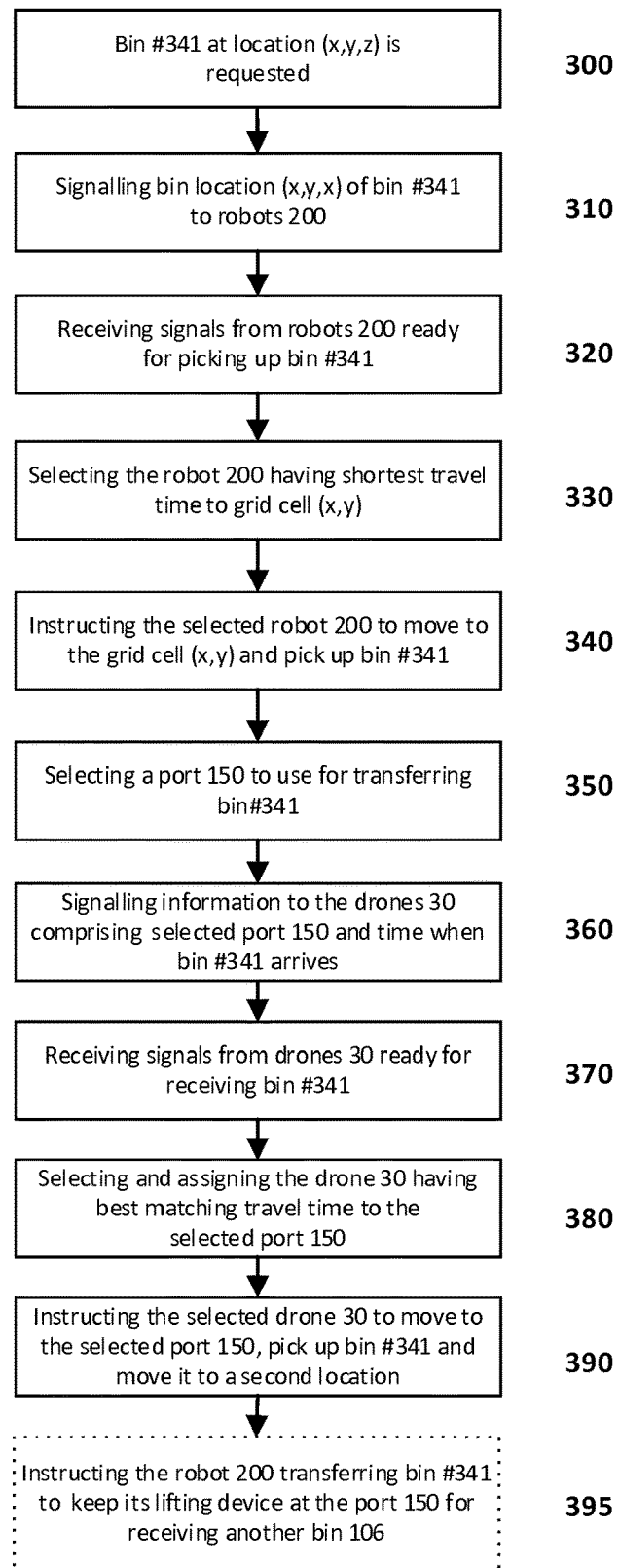
FIG. 3 illustrates the steps performed for retrieving a bin.

FIG. 3 shows an example illustrating the steps performed when retrieving a bin/storage container 106. In this example, bin #341 is to be retrieved from the storage grid 104.

The first step 300 is to determine the location (x,y,z) of the requested bin #341, e.g. (2,5,4). This means that it is stored in grid cell (2,5) at level 4, i.e. there are 3 other storage containers 106 stacked on top of it. This location is in step 310 signalled to the robots/container handling vehicles 200.

The robots that currently are available for handling the bin will report this, and as indicated in step 320, the operational controller will receive signals from the robots 200 that are ready for picking up bin #341.

In step 330, the robot 200 having the shortest travel time to grid cell (x,y), in this case cell (2,5) will be selected. This is based on calculations—available routes (that are not blocked) are quite complex due to other robots that are constantly moving on the grid. When a specific robot is selected, it is instructed to move to grid cell (x,y), i.e. (2,5) in this example, and to pick up the bin, ref. step 340. Since the bin is stored below three other bins, the other bins must first be removed before the bin #341 is accessible. This operation can be performed by the selected robot itself, or by other robots. These may be specialized for the task. Ideally, bin #341 has been dug up when the selected robot arrives at the destination cell.

The next step 350 is to select which port 150 to use for transferring bin #341 to a drone 50. The number of available ports 150 and the location of ports 150 and its corresponding grid cell 122 depend on the constructional features of the storage grid 104. Larger systems will typically be constructed with more ports 150 than smaller systems. Only one port 150 can be used, however at least two ports 150 will provide a more efficient solution where one can be used for transferring a bin 106 from a robot 200 to a drone 30, while at the same time the other can be used for transferring a bin from a drone 30 to a robot 200.

In larger systems several ports 150 can be grouped together and/or be spread out such that different locations in the area covered by the storage grid 106 are covered.

The port 150 selected for transferring the bin is signalled to the drones 30 as well as the time the bin will arrive at the port 150, ref. step 360.

The drones 30 that are currently available for handling the bin #341 will report this, and as indicated in step 370, the operational controller will receive signals from the drones 30 that are ready for picking up the bin.

The drone 30 that is selected is assigned for picking up bin #341 as indicated in 380. This will normally be the drone 30 having the best matching travel time to the specific port 150. It may also be a drone having the shortest travel time to the assigned port 150. This drone 30 will then be instructed to move to the selected port 150, pick up bin #341 and move it to another location, ref. step 390. The port is at a first location, the other location is a second location, e.g. a conveyor belt of picking station.

In one embodiment, the robot 200 is instructed to stay at the grid cell 122 where the port 150 is located and to keep its lifting device at the port for returning another bin 106 to the storage grid 106, ref. step 395. This will save time since the lifting device of the robot 200 is already at the port 150 when the robot 200 is instructed to store another bin 106 in the storage grid 104.

Figure 4:
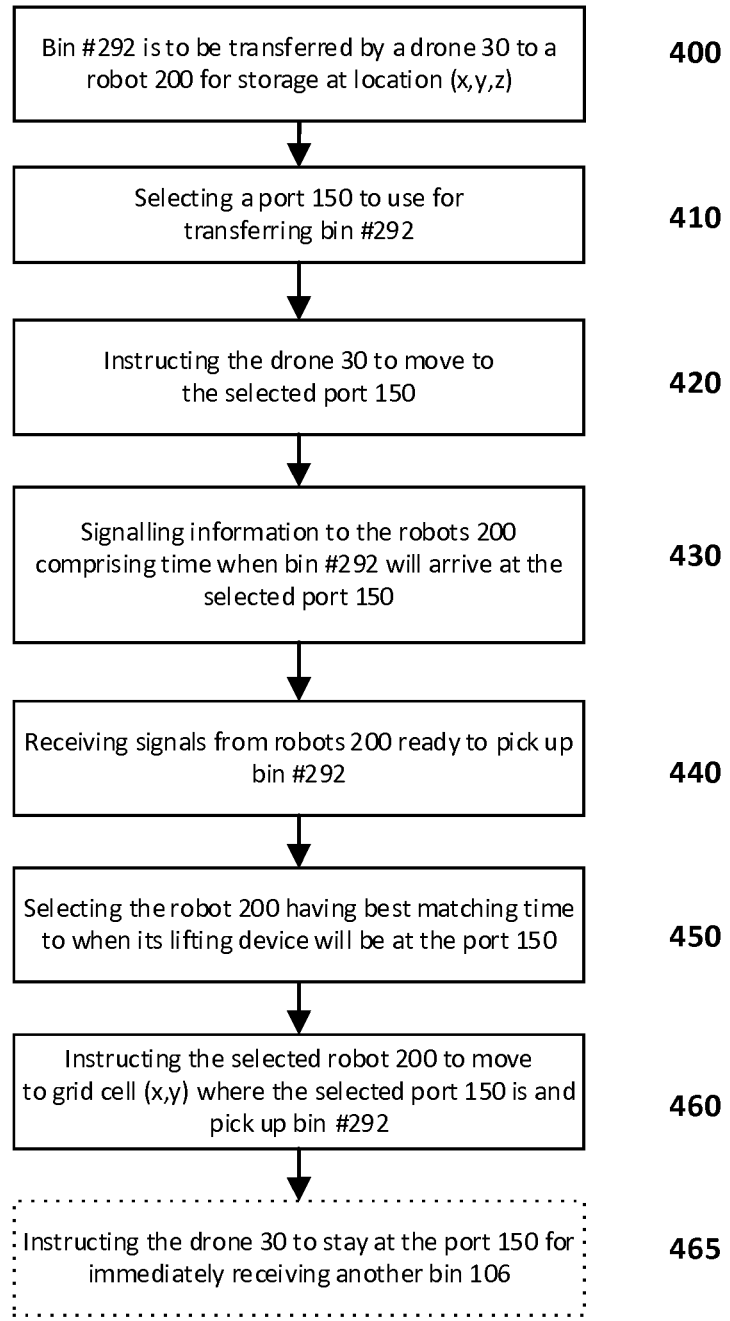
FIG. 4 illustrates the steps performed for storing a bin.

FIG. 4 shows an example illustrating the steps performed when storing a bin/storage container 106. In this example, bin #292 is to be stored in the storage grid 104. The port 150 may for instance be located at grid cell (7,1).

The port 150 to use for transferring a bin 106 to the storage grid 104 is selected, ref. step 410. Which port 150 to use for transferring bin #292 to a robot 200 will as in the previous example above depend on different factors such as the number of available ports 150 and the location of ports 150.

When a port 150 to use is determined, the drone 150 is instructed to move to the selected port 150, ref. step 420. Information of the selected port 150, and the time when bin #292 will be available at the port is transmitted to the robots 200, ref. step 430.

The robots that are currently available for handling the bin will report this, and as indicated in step 440, the operational controller will receive signals from the robots 200 that are ready for picking up bin #292.

The robot 200 having the best matching travel time to grid cell (7,1) and to when its lifting device is available at the port 150, in view of the drone 150 delivering bin #292, will be selected and assigned for retrieving the bin, ref. step 450. This is based on calculations—available routes (that are not blocked) are quite complex due to other robots that are constantly moving on the grid. The selected robot 200 is instructed to move to grid cell (7,1) lower its lifting device to the port 150 and pick up bin #292 and place it at a location (x,y,x) for storage.

In one embodiment, the drone 30 is instructed to stay at the port 150 for retrieving another bin 106 from the storage grid 106, ref. step 465. This will save time when for instance another robot 150 already has retrieved a bin and lowered it to a port 150 nearby.

Figure 5:
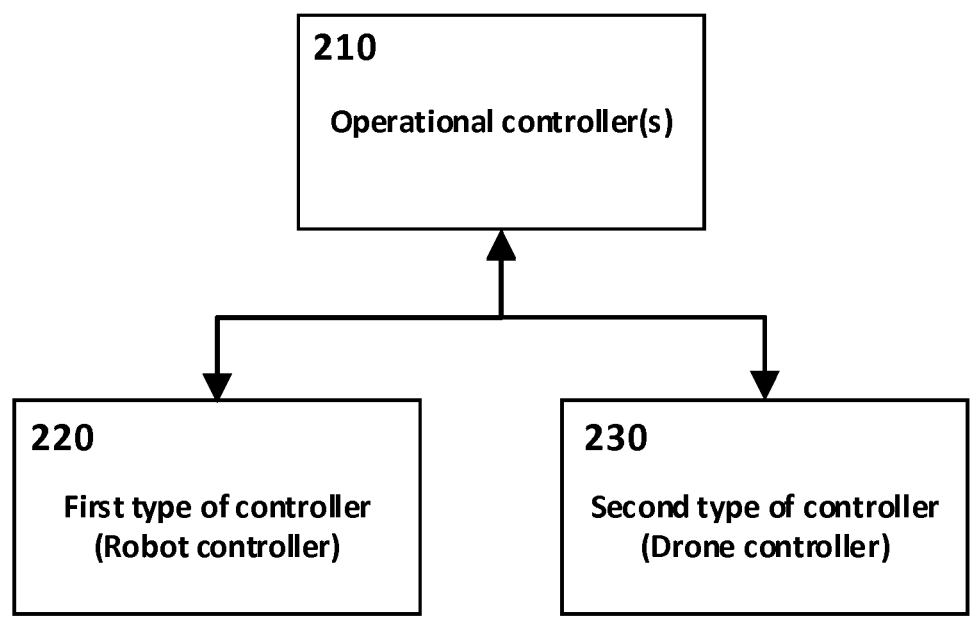
FIG. 5 illustrates communication paths between an operational controller, drones and container handling vehicles (robots).

FIG. 5 illustrates a system enabling controlling operation of container handling vehicles 200, running on top of the storage grid 104, and remotely operated drones 30, operating at a level below an automated storage and retrieval system 10, such that total elapsed time or waiting time cost for transferring storage containers 106 between them is minimal or optimal based on a weighting function.

The system comprises an operational controller 210 that is signal connected to all robot controllers and all drone controllers. Communication paths are provided between at least one operational controller 210, a first type of controller 220 in each container handling vehicle/robot 200 and a second type of controller 230 in each drone 30. In this way, the operational controller(s) 210 will always have overview and control of locations and availability of robots and drones. The interaction of the controllers enables to perform the method described above.

The invention claimed is:

1. A method for controlling operation of container handling vehicles and remotely operated specialized container handling vehicles in an automated storage and retrieval system having a storage grid for storing storage containers in grid cells, the method comprising:

transferring a specified storage container from a storage column and its corresponding grid cell to a specialized container handling vehicle, where the specialized container handling vehicles having wheels are operating at a level below the automated storage and retrieval system, and where the storage containers are stored and retrieved by container handling vehicles running on top of the storage grid, including:

assigning and instructing a container handling vehicle to pick up the storage container from the grid cell and lower it to a selected port, located at a lower end of an identified free delivery column by transmitting instructions to a first type of controller of the assigned container handling vehicle, where the port selected is included as a variable in a weighting function together with time and waiting cost to derive a trade-off of the container handling vehicle and the specialized container handling vehicle having a best matching travel time to the port;

moving the container handling vehicle to the grid cell, picking up the storage container and transporting it to a grid cell of the delivery column where the port is;

transmitting a signal to the specialized container handling vehicles comprising information of the selected port at a first location and when the storage container will be available at the port;

based on responses from the specialized container handling vehicles, assigning and instructing a specialized container handling vehicle to retrieve the specified storage container at the selected port;

moving the assigned specialized container handling vehicle to the selected port at the first location, picking up the storage container and bringing it to a second location; and transferring a specified storage container to a grid cell, for storage in its corresponding storage column, by a specialized container handling vehicle, including:

determining which port at a first location that is to be used, where the port selected is included as a variable in a weighting function together with time and waiting cost to derive a trade-off of the container handling vehicle and the specialized container handling vehicle having the best matching travel time to the port;

transmitting instructions to a second type of controller of the specialized container handling vehicle, to transport the storage container from its current location representing the second location, to said determined port at the first location;

moving the specialized container handling vehicle from the second location to the determined port at the first location;

transmitting a signal to the container handling vehicles comprising information of the determined port to retrieve the storage container from;

based on responses from the container handling vehicles, assigning and instructing a container handling vehicle to lift and retrieve the specified storage container from the determined port to be used at the first location;

lifting the storage container from the determined port through the delivery column and moving the container handling vehicle for transporting the storage container to a grid cell corresponding to the storage column the specified storage container is to be transferred to.

2. The method according to claim 1, where time for performing digging operations for retrieving the specified storage container is included in the travel time of a container handling vehicle to the port.

3. The method according to claim 1, where, when a specified storage container is to be transferred to a grid cell by the specialized container handling vehicle and the container handling vehicle, the container handling vehicle assigned for retrieving the specified storage container from the said port at the first location is the one which is currently available and will have the best matching travel time to the port and shortest time for lowering its lifting device to the port from its current location.

4. The method according to claim 1, where, when a specified storage container is to be retrieved from a grid cell by the container handling vehicle and the specialized container handling vehicle, the specialized container handling vehicle assigned for retrieving the specified storage container from the said port at the first location is the one which is currently available and will have the best matching travel time from its current location to the port.

5. A system for controlling operation of container handling vehicles and remotely operated specialized container handling vehicles, comprising:

an automated storage and retrieval system having a framework structure defining a storage grid for storing storage containers in grid cells, the storage containers stored and retrieved by the container handling vehicles running on top of the storage grid, the specialized container handling vehicles having wheels and operating at a level below the automated storage and retrieval system, and at least one operational controller in communication with a first type of controller in each container handling vehicle and a second type of controller in each specialized container handling vehicle, wherein the at least one operational controller is configured to:

control transfer of a specified storage container from a storage column and its corresponding grid cell to a specialized container handling vehicle, by performing:

assigning and instructing a container handling vehicle to pick up the storage container from the grid cell and lower it to a selected port, located at the lower end of an identified free delivery column by transmitting instructions to a first type of controller of the assigned container handling vehicle, where the port selected is included as a variable in a weighting function together with time and waiting cost to derive a trade-off of the container handling vehicle and the specialized container handling vehicle having a best matching travel time to the port;

moving the container handling vehicle to the grid cell, picking up the storage container and transporting it to a grid cell of the delivery column where the port is;

transmitting a signal to the specialized container handling vehicles comprising information of the selected port at a first location and when the storage container will be available at the port;

based on responses from the specialized container handling vehicles, assigning and instructing a specialized container handling vehicle to retrieve the specified storage container at the selected port;

moving the assigned specialized container handling vehicle to the selected port at the first location, picking up the storage container and bringing it to a second location; and control transfer of a specified storage container to a grid cell, for storage in its corresponding storage column, by a specialized container handling vehicle, by performing:

determining which port at a first location that is to be used, where the port selected is included as a variable in a weighting function together with time and waiting cost to derive a trade-off of the container handling vehicle and the specialized container handling vehicle having the best matching travel time to the port;

transmitting instructions to a second type of controller of the specialized container handling vehicle, to transport the storage container from its current location representing the second location, to said determined port at the first location;

moving the specialized container handling vehicle from the second location to the determined port at the first location;

transmitting a signal to the container handling vehicles comprising information of the determined port to retrieve the storage container from;

based on responses from the container handling vehicles, assigning and instructing a container handling vehicle to lift and retrieve the specified storage container from the determined port to be used at the first location;

lifting the storage container from the determined port through the delivery column and moving the container handling vehicle for transporting the storage container to a grid cell corresponding to the storage column the specified storage container is to be transferred to.

6. A computer-readable medium storing a program that when executed, causes a computer to carry out steps of the method of claim 1 for controlling the operation of the container handling vehicles and the remotely operated specialized container handling vehicles when transferring storage containers between them.

* * * * *